US011263641B2

(12) United States Patent
Chantz

(10) Patent No.: US 11,263,641 B2
(45) Date of Patent: Mar. 1, 2022

(54) COGNITIVE OPERATIONAL VEHICLE BLOCKCHAIN FOR PRIVILEGES, LICENSING, EVALUATION, AUTHORIZATION, AND TRAINING

(71) Applicant: International Business Machines Corporation, Armonk, NY (US)

(72) Inventor: Hyman Chantz, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 779 days.

(21) Appl. No.: 15/915,102

(22) Filed: Mar. 8, 2018

(65) Prior Publication Data
US 2019/0279227 A1    Sep. 12, 2019

(51) Int. Cl.
G06Q 30/00 (2012.01)
G06Q 30/04 (2012.01)
G06F 16/27 (2019.01)
G06Q 50/06 (2012.01)
G06Q 20/14 (2012.01)
(Continued)

(52) U.S. Cl.
CPC ........ *G06Q 30/018* (2013.01); *G06F 16/27* (2019.01); *G06Q 20/102* (2013.01); *G06Q 20/14* (2013.01); *G06Q 20/145* (2013.01); *G06Q 30/04* (2013.01); *G06Q 50/06* (2013.01); *G06Q 40/08* (2013.01); *G06Q 2220/00* (2013.01)

(58) Field of Classification Search
CPC ...... G06Q 30/04; G06Q 30/018; G06Q 50/06; G06Q 20/14; G06Q 20/102; G06Q 20/145; G06F 16/27

USPC .......................................................... 705/34
See application file for complete search history.

(56) References Cited

U.S. PATENT DOCUMENTS 7,865,451 B2    1/2011    Hyder et al.
9,704,119 B2    7/2017    Wiig et al.
(Continued)

FOREIGN PATENT DOCUMENTS

WO    WO2017145007 A1    8/2017
WO    WO2017153495 A1    9/2017
WO    WO2017187397 A1    11/2017

OTHER PUBLICATIONS

Salih, Raed M. Using Agent-Based Implementation of Active Data Bundles for Protecting Privacy in Healthcare Information Systems. Western Michigan University. ProQuest Dissertations Publishing, 2018. (Year: 2018).*

(Continued)

*Primary Examiner* — Florian M Zeender
*Assistant Examiner* — Fawaad Haider
(74) *Attorney, Agent, or Firm* — Yee & Associates, P.C.

(57) ABSTRACT

Providing a cognitive blockchain for user privileges is provided. A distributed secure encrypted ledger is established for storing information related to privileges for users across a plurality of nodes in a permissioned network with known identities. An internet of things (IoT) device node in the plurality of nodes records a first block in the distributed secure encrypted ledger containing activity information related to a privilege corresponding to a user of the IoT device node. A licensing node in the plurality of nodes evaluates information in the first block. The licensing node records a second block containing privilege information corresponding to the user of the IoT device node based on the evaluating.

15 Claims, 7 Drawing Sheets

(51) Int. Cl.
*G06Q 20/10* (2012.01)
*G06Q 40/08* (2012.01)

(56) References Cited

U.S. PATENT DOCUMENTS

| | | | | |
|---|---|---|---|---|
| 2011/0087401 | A1* | 4/2011 | Tsao | B60Q 1/50 |
| | | | | 701/36 |
| 2013/0338914 | A1* | 12/2013 | Weiss | G08G 1/0112 |
| | | | | 701/465 |
| 2014/0129573 | A1 | 5/2014 | deWaal | |
| 2014/0309849 | A1* | 10/2014 | Ricci | G01C 21/26 |
| | | | | 701/33.4 |
| 2015/0193779 | A1* | 7/2015 | Lima | G06Q 30/018 |
| | | | | 705/317 |
| 2018/0218454 | A1* | 8/2018 | Simon | H04L 9/3239 |
| 2018/0255381 | A1* | 9/2018 | Cella | G06N 3/02 |
| 2018/0342036 | A1* | 11/2018 | Zachary | H04L 9/0637 |
| 2019/0164137 | A1* | 5/2019 | Vincent | H04W 12/08 |

OTHER PUBLICATIONS

Samaniego et al., "Internet of Smart Things—IoST", 2017 IEEE 1st International Conference on Cognitive Computing, Jun. 2017, 8 pages.
Lazaroiu et al., "Smart District through IoT and Blockchain", 6th International Conference on Renewable Energy Research and Applications, Nov. 2017, 8 pages.
Sharples et al., "The Blockchain and Kudos: A Distributed System for Educational Record, Reputation and Reward", European Conference on Technology and Enhanced Learning, in Adaptive and Adaptable Learning, Copyright 2016, pp. 490-496.

* cited by examiner

300 OPERATIONAL CONTROL OF VEHICLE VIA BLOCKCHAIN PROCESS

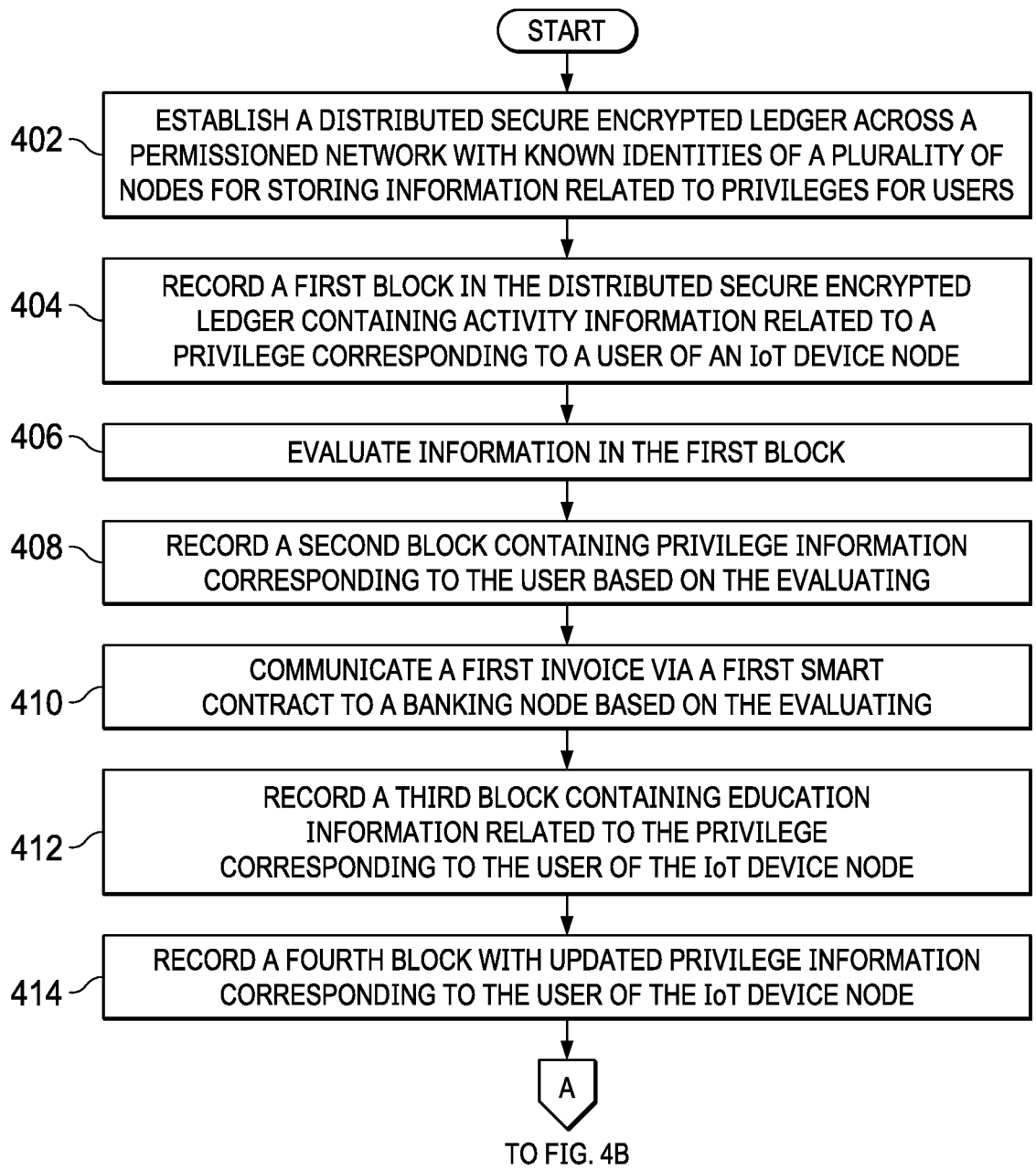

COGNITIVE OPERATIONAL VEHICLE BLOCKCHAIN FOR PRIVILEGES, LICENSING, EVALUATION, AUTHORIZATION, AND TRAINING

BACKGROUND

1. Field

The disclosure relates generally to automated distributed ledger technologies, often called "blockchains", and more specifically to providing a cognitive blockchain for user privileges corresponding to operational control of a vehicle.

2. Description of the Related Art

A blockchain exists as a shared and continuously reconciled database. The distribution and reconciliation of the database can be done automatically, by time, by some internal or extrinsic event, or by other criteria. In each case, a blockchain is a continuously growing chain of data blocks, which are linked and secured using cryptography. Each block typically contains a cryptographic hash of the previous block in the blockchain, as well as a timestamp and data corresponding to an event, such as a financial transaction, operational event, or an output event often called a "smart contract". The cryptographic hash of the previous block in the blockchain, links the two blocks. The linked blocks form the blockchain. Blocks are appended in chronological order. In other words, the last block in the chain is the most recent block. Further, blocks are immutable (i.e., cannot be changed or deleted).

By design, a blockchain is resistant to modification of the data. For use as a distributed, decentralized ledger (i.e., not stored in just one central network node), a blockchain is typically managed by a network of nodes collectively adhering to a protocol for validating new blocks. Each node connected to, or connecting to, the network receives a copy of the blockchain, which is downloaded automatically. Once recorded, the data in any given block cannot be altered retroactively without the alteration of all subsequent blocks.

Thus, decentralized consensus is achieved using a blockchain. This decentralized consensus makes blockchains suitable for the recording of events, medical records, identify management, financial transaction processing, document provenance, food traceability, or voting, for example. In addition, a blockchain can assign rights because the blockchain provides a record that compels offer and acceptance.

Blockchain-based smart contracts are computer-generated legal contracts that can be partially or fully executed or enforced without human interaction. In other words, a smart contract is a computer protocol that digitally facilitates, verifies, or enforces negotiation or performance of a contract. The blockchain-based smart contract is enabled by programming instructions that define and execute an agreement. The blockchain-based smart contract can write, record, or effect a financial or other transaction, and/or conduct a tangible, real world operation.

SUMMARY

According to one illustrative embodiment, a computer-implemented method for providing a cognitive blockchain for user privileges is provided. A distributed secure encrypted ledger is established for storing information related to privileges for users across a plurality of nodes in a permissioned network with known identities. An internet of things (IoT) device node in the plurality of nodes records a first block in the distributed secure encrypted ledger containing activity information related to a privilege corresponding to a user of the IoT device node. A licensing node in the plurality of nodes evaluates information in the first block. The licensing node records a second block containing privilege information corresponding to the user of the IoT device node based on the evaluating. According to other illustrative embodiments, a network data processing system and computer program product for providing a cognitive blockchain for user privileges are provided.

BRIEF DESCRIPTION OF THE DRAWINGS

FIGS. 4A-4B are a flowchart illustrating a process for providing a cognitive blockchain for user privileges in accordance with an illustrative embodiment.

DETAILED DESCRIPTION

Figure 1:
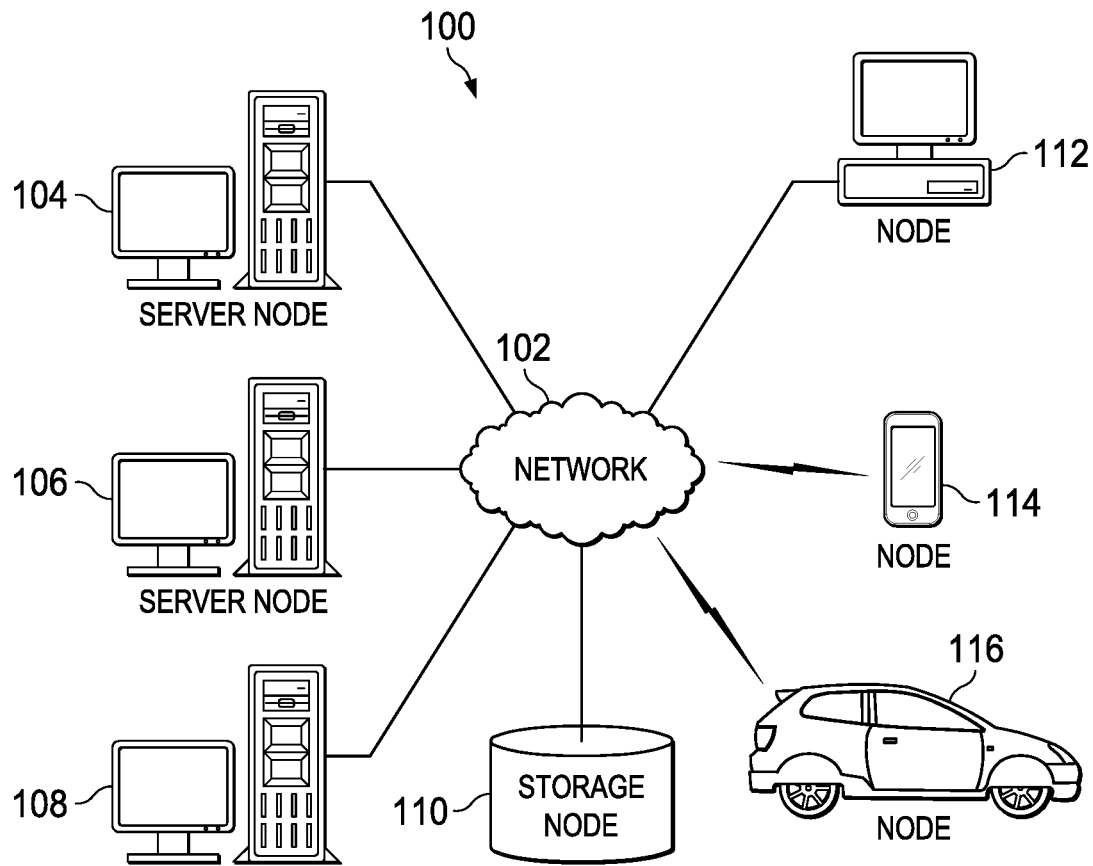
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
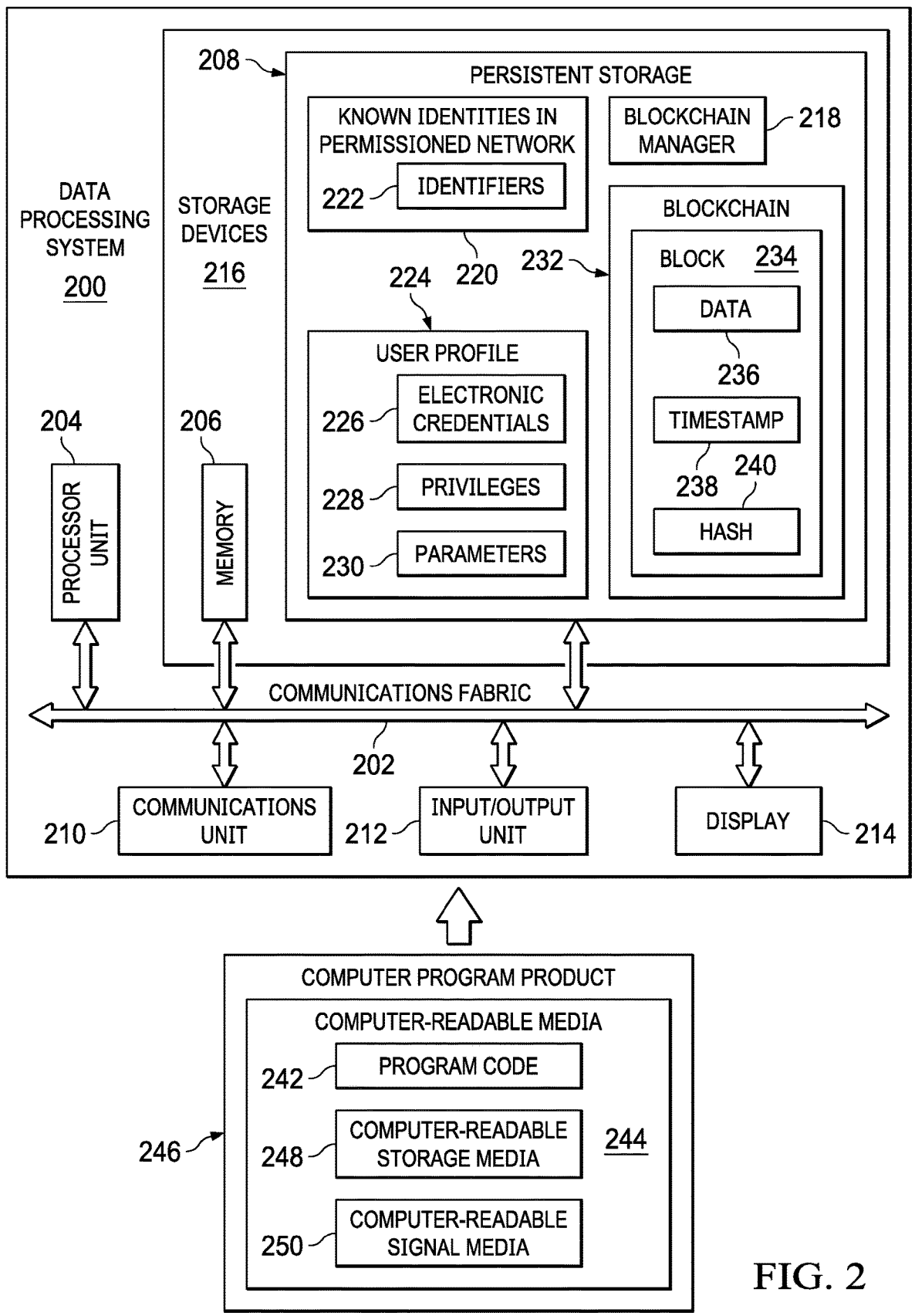
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables. Further, network 102 may be a permissioned network with known identities of connected data processing nodes. For example, network 102 may be a peer-to-peer network of data processing nodes. Furthermore, network 102 also may enable each node connected to network 102 to automatically broadcast and share a blockchain of cryptographically protected and chronologically ordered data with all other nodes connected to network 102.

In the depicted example, server node 104, server node 106, and server node 108 connect to network 102, along with storage 110. Server node 104, server node 106, and server node 108 may be, for example, server computers with high-speed connections to network 102. In addition, server node 104, server node 106, and server node 108 may provide services to client device users. For example, server node 104 may provide banking institution services, server node 106 may provide insurance company services, and server node 108 may provide governmental agency licensing services. However, it should be noted that server node 104, server node 106, and server node 108 may provide any type of service and/or perform any type of function. Also, server node 104, server node 106, and server node 108 may each represent a cluster of servers. Alternatively, server node 104, server node 106, and server node 108 may represent groups of servers in a cloud environment. In addition, server node 104, server node 106, and server node 108 also may provide information, such as software applications and programs, to client devices.

Node 112, node 114, and node 116 also connect to network 102. Node 112, node 114, and node 116 are data processing devices and are clients of server node 104, server node 106, and/or server node 108. In this example, node 112 is illustrated as a desktop or personal computer with wire communication links to network 102, while node 114 and node 116 are illustrated as a smartphone and a smart vehicle, respectively, with wireless communication links to network 102. However, it should be noted that nodes 112, 114, and 116 are meant as examples only. In other words, nodes 112, 114, and 116 may include other types of data processing devices, such as, for example, network computers, production line computers, control room computers, laptop computers, handheld computers, smart televisions, smart watches, smart appliances, gaming devices, kiosks, and the like, with wire or wireless communication links to network 102.

Users of nodes 112, 114, and 116 may utilize nodes 112, 114, and 116 to perform any type of task. Further, nodes 112, 114, and 116 may monitor and record operations, tasks, activities, and events performed by the users. Furthermore, nodes 112, 114, and 116 may perform testing simulations and training on users. Moreover, nodes 112, 114, and 116 may enable, disable, or restrict operations, tasks, or activities performed by users based on, for example, testing, training, credentials, and privileges, which correspond to respective users.

Storage 110 is a network storage device capable of storing any type of data in a structured format or an unstructured format. In addition, storage 110 may represent a plurality of network storage devices. Further, storage 110 may store identifiers for a plurality of nodes and node users in network 102, profiles for the plurality of client device users, and the like. Furthermore, storage unit 110 may store other types of data, such as authentication or credential data that may include user names, passwords, and biometric data associated with the plurality of node users and system administrators, for example.

In addition, it should be noted that network data processing system 100 may include any number of additional server nodes, client nodes, storage devices, and other data processing devices not shown. Program code located in network data processing system 100 may be stored on a computer readable storage medium and downloaded to a computer or other data processing device for use. For example, program code may be stored on a computer readable storage medium on server node 104 and downloaded to node 112 over network 102 for use on node 112.

With reference now to FIG. 2, a diagram of a data processing system is depicted in accordance with an illustrative embodiment. Data processing system 200 is an example of a permissioned network node, such as server node 104 or node 112 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores blockchain manager 218. However, it should be noted that even though blockchain manager 218 is illustrated as residing in persistent storage 208, in an alternative illustrative embodiment blockchain manager 218 may be a separate component of data processing system 200. For example, blockchain manager 218 may be a hardware component coupled to communication fabric 202 or a combination of hardware and software components.

Blockchain manager 218 controls the process for providing a cognitive blockchain for user privileges corresponding to operational control of a device or machine, such as, for example, a vehicle. Blockchain manager 218 maintains known identities in permissioned network 220, which is a list of all nodes connected to a permissioned network, such as network 102 in FIG. 1. The known identities may be, for example, server node 104, server node 106, server node 108, node 112, node 114, and node 116 in FIG. 1. In addition, known identities in permissioned network 220 includes identifiers 222. Each identifier in identifiers 222 uniquely identifies a particular node in the known identities connected to the permissioned network for sharing information, such as blockchains.

Blockchain manager 218 also maintains user profile 224. User profile 224 represents an information profile corresponding to a user of data processing system 200. Of course, user profile 224 may represent a plurality of different user profiles corresponding to a plurality of different users of data processing system 200.

In this example, user profile 224 includes electronic credentials 226, privileges 228, and parameters 230. However, it should be noted that user profile 224 may include any information regarding a user, such as, for example, name, age, residence, employer, job role, education, degrees, training, and the like. Electronic credentials 226 represent a set of one or more credentials, such as, for example, a driver license, which corresponds to the user. Privileges 228 represent a set of one or more privileges, such as, for example, a privilege to operate a vehicle, which corresponds to electronic credentials 226. Parameters 230 represent a set of one or more parameters or restrictions, such as, for example, no nighttime vehicle operation, which corresponds to electronic credentials 226 and privileges 228.

Blockchain manager 218 further maintains blockchain 232. Blockchain 232 represents a secure distributed chronological chain of a plurality of data blocks. Blockchain manager 218 secures blockchain 232 using cryptography. Distributed means that blockchain 232 is transmitted to and shared by all nodes in known identities in permissioned network 220 each time a new block is appended to blockchain 232.

Blockchain 232 includes block 234. Block 234 represents a single block of data in blockchain 232 and may represent a last or most recent block appended to blockchain 232. In this example, block 234 includes data 236, timestamp 238, and hash 240. However, it should be noted that alternative illustrative embodiments may include more or less information in block 234 than illustrated.

Data 236 may represent any type of information. For example, data 236 may include a record of an event, activity, task, or operation performed by the user on data processing system 200 or a device coupled to data processing system 200. In addition, data 236 may include other information, such as, for example, device operation enablement, device operation disablement, device operation restrictions, instructions, invoices, payments, smart contracts, and the like, intended for one or more other nodes or users in known identities in permissioned network 220.

Timestamp 238 represents a timestamp of the current time when blockchain manager 218 generated block 234. Blockchain manager 218 generates block 234 upon occurrence of an event, activity, task, or operation performed by the user. Alternatively, blockchain manager 218 may generate block 234 at expiration of a predetermined period of time, such as, for example, at five-minute intervals.

Hash 240 represents a cryptographic hash of the immediately preceding block to block 234 in blockchain 232 and links the immediately preceding block to block 234. Blockchain manager 218 may generate hash 240 using, for example, Secure Hash Algorithm 2 (SHA-2), SHA-3, or Message Digest 5 (MD5) algorithm.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user of data processing system 200 and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Both human and machine operators in fields, such as, for example, automotive driving, aviation flying, utility (e.g., water, sewer, electric, oil, and gas) plant operation, nuclear plant operation, medical equipment operation, surgical equipment operation, production line operation, and other mission-critical fields, must be carefully selected, trained, authorized, monitored, promoted, demoted, or removed for each critical environment in which these operators operate or interoperate. In addition, operation privileges given to operators may vary, while their operation capabilities may decline or improve over time. Further, an operator's capabilities may in some cases be transferrable through various devices, enterprises, and equipment.

Not only do operational considerations exists, but financial considerations as well, such as insurance costs, licensing fees, invoice payments, and the like. For example, illustrative embodiments may enable an insurance carrier data processing system to dynamically weight, assess, actuarily review, promote, and deliver insurance premiums. Similarly, illustrative embodiments may enable a governmental agency data processing system to review candidate training and licensure requirements and deliver licensing fee invoices. Illustrative embodiments utilize a quasi-licensure, cognitive blockchain operational process with smart contract effectuation to enable this situation for both the operator (e.g., human or machine) and the device (e.g., electronic device, vehicle, aircraft, ship, train, machine, production line, or control panel).

In addition to operator and device operation monitoring, illustrative embodiments also may enable scheduled or unscheduled simulation testing of operators, which may or may not be known by the operators beforehand, prior to operating a device or machine. Illustrative embodiments record each significant operator and device event in a blockchain and broadcast the blockchain to all nodes in a permissioned network with known identities, such as, for example, a peer-to-peer network. Each node analyzes the received blockchain, and when appropriate, performs an action based on data and/or instructions contained within the last (i.e., most recent) block in the chronologically ordered blockchain. Then, the node or nodes performing an action generate a new block for the event, append the new block to the end of the blockchain, and transmit the updated blockchain to the other nodes in the permission network. Thus, illustrative embodiments provide a low cost, near real-time, cryptographically assured, and immutable data record of events, information, instructions, permissions, restrictions, parameters, electronic credentials, invoices, payments, smart contracts, training, testing, and the like.

Illustrative embodiments establish a blockchain fabric, blockchain code, and user interface between all data processing nodes of the permissioned network. Data processing nodes within the permissioned network may be found in, for example, semi-autonomous or autonomous vehicles, such as automobiles, vans, buses, trucks, semis, motorcycles, and the like, semi-autonomous or autonomous aircraft, such as planes, jets, helicopters, gliders, drones, and the like, semi-autonomous or autonomous watercraft, such as boats, ships, submarines, and the like, ground air traffic control towers, control rooms, and electronic devices; or at, for example, vehicle manufacturing companies, governmental regulatory agencies, automobile regulators, title holders or lessees of vehicles, driver training schools, energy companies for vehicle carbon emissions, federal aviation administration offices, insurance companies, utility companies, technical colleges, and the like.

Figure 3A:
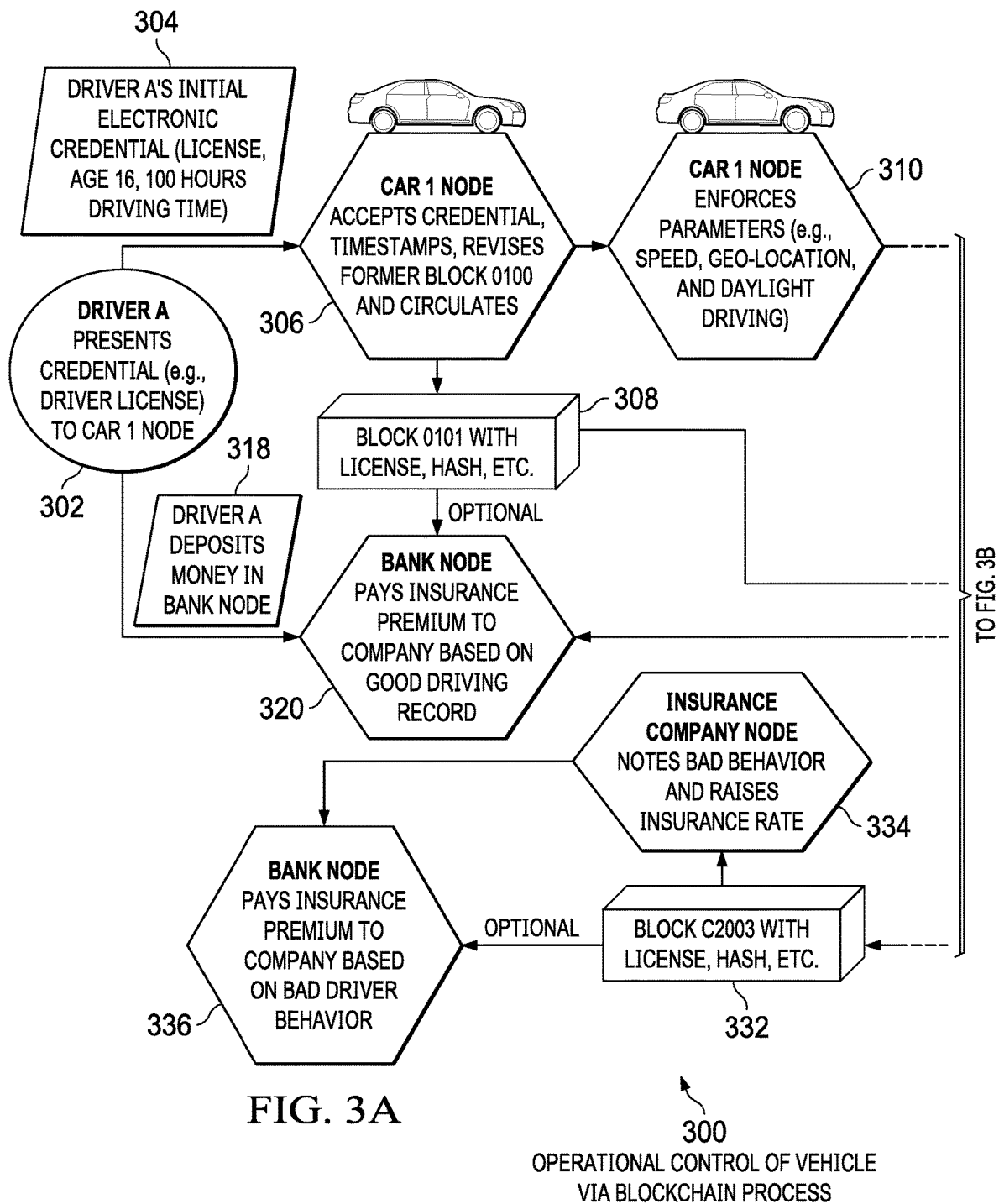
FIGS. 3A-3C are a diagram illustrating an example of operational control of a vehicle via blockchain in accordance with an illustrative embodiment.
Figure 3B:
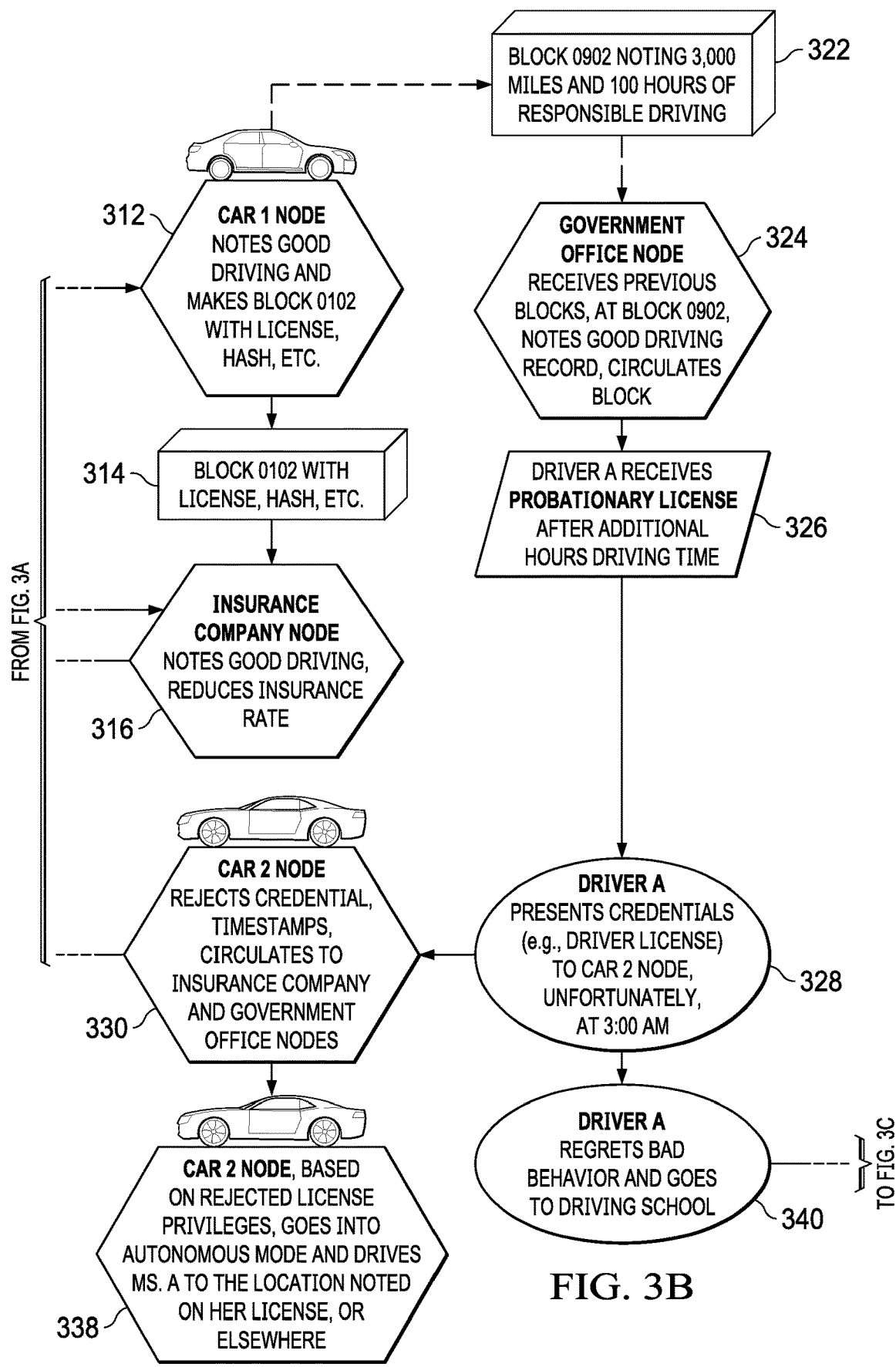
Figure 3C:
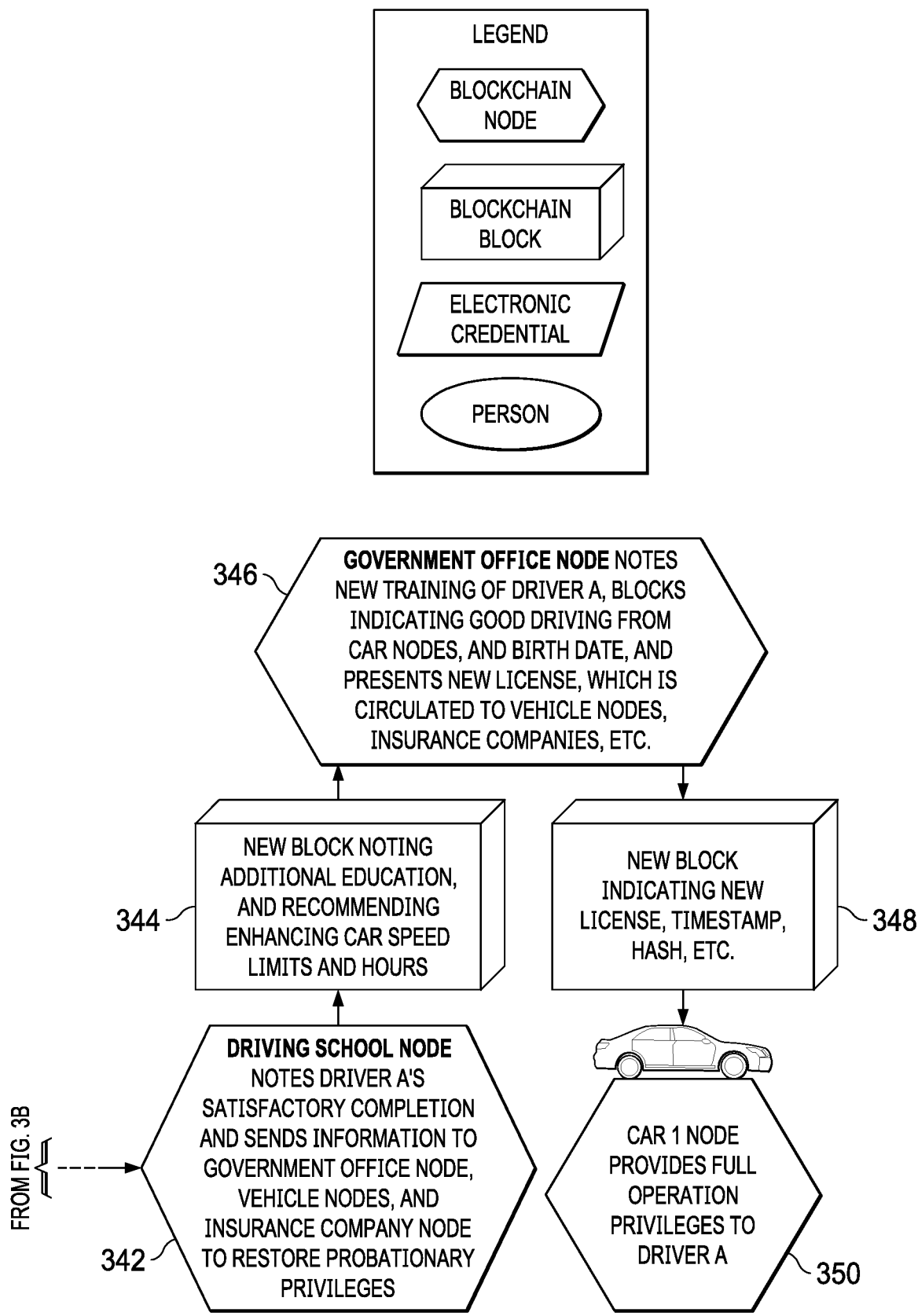

With reference now to FIGS. 3A-3C, a diagram illustrating an example of operational control of a vehicle via blockchain is depicted in accordance with an illustrative embodiment. Operational control of vehicle via blockchain process 300 may be implemented in, for example, a network data processing system, such as network data processing system 100 in FIG. 1. It should be noted that operational control of vehicle via blockchain process 300 is intended as an example only. In other words, alternative illustrative embodiments may control operation of other devices and machines, such as, for example, aircraft, trains, ships, control room panels, production lines, computers, and the like.

At 302, a prospective driver, "Driver A", presents a credential electronically to a vehicle node, "Car 1", in a plurality of data processing nodes in a permissioned network of known identities, such as network 102 in FIG. 1. Information in a vehicle node for each human licensee may include governmental and other requirements such as: maximum driving speeds; geographical driving ranges; turning radius/ratio; turning light intensity, illumination, and duration; digital key sharing for multiple users of the vehicle node; times and conditions of miles driven; insurance personal allocation; pooled access to different vehicles; and inter-system toll integration for public and private roads, allocated to each driver and/or passenger, rather than for each vehicle. Information written to a vehicle node may come from different sources, such as, for example, the vehicles global positioning system device; radio frequency devices; toll road collection information; dashboard instrumentation; infra-red, advanced optical, and radar detection devices; keyless entry device; coupled mobile phones; Bluetooth devices; inter-vehicle communications; electric vehicle (EV) usage, charging, and payment information; and automatic maintenance and health information.

Electronic credential 304 may include information, such as, for example, Driver A's initial electronic driver license authorized as a student driver only, age 16, and 100 hours of driving time. At 306, Car 1 accepts the electronic credential, timestamps the event, and updates current block "B0100" in a blockchain to generate new block "B0101" at 308. The blockchain may be, for example, blockchain 232 in FIG. 2. New block "B0101" includes the electronic credential, the event, the timestamp, and a hash of block "B0100". Car 1 electronically broadcasts the blockchain with appended new block "B0101" to all other data processing nodes in the permissioned network of known identities. Nodes may include other vehicle nodes, an insurance company node, a bank node, a government licensing node, and a driving school node, for example.

At 310, Car 1 only allows Driver A to operate Car 1 under certain parameters, such as, for example, restrict speed to under 80 miles per hour, limit driving to only daylight hours, and limit driving within a circumscribed area defined by GPS coordinates. Car 1 enforces these defined parameters and records driving events corresponding to Driver A in the blockchain. At 312, after Driver A completes a particular trip (e.g., for a certain number of driving hours, over a number of days, on a particular route), Car 1 records information regarding this particular trip in a new block "B0102" at 314, which Car 1 then distributes via the blockchain.

At 316, the insurance company node receives new block "B0102" in the blockchain and notes Driver A's good driving record and additional driving experience and reduces Driver A's insurance rate. The insurance company node sends an invoice for the insurance premium via smart contract to the bank node corresponding to Driver A. At 318, Driver A deposits money for the insurance premium into an account in the bank node. At 320, the bank node automatically debits Driver A's bank account for the insurance premium invoice amount, pays the insurance company node, and records information regarding each event in the blockchain, along with timestamps for each event, and block hashes.

In due course at 322, Car 1 generates new block "B0902", which indicates that Driver A is now 18 years of age, with 100 hours of trouble-free driving over 3,000 miles, appends new block "B0902" to the blockchain, and broadcasts the blockchain to the other nodes in the permissioned network. At 324, a government licensing node in the permissioned network receives the blockchain with appended new block "B0902" and notes Driver A's good driving record. As a result, the government licensing node converts Driver A's student driver license to a probationary full license. However, the probationary full license includes parameters, such as allowing unrestricted driving to any geographic location without vehicle speed restrictions, but not allowing driving between 2:00 AM and 6:00 AM local time. In addition, the government licensing agency communicates an invoice via a smart contract in the blockchain to the bank node corresponding to Driver A in response to issuing the new license to Driver A.

At 326, Driver A receives the probationary full license with parameters. At 328, Driver A presents the new electronic credential (i.e., new probationary full license with parameters) to a friend's vehicle node, "Car 2", in the permissioned network. Unfortunately, Driver A presents the new electronic credential to Car 2 at 3:00 AM. At 330, Car 2 rejects the new electronic credential based on the defined driving parameters for Driver A, records and timestamps the event in new block "C2003" of the blockchain, and disables operation of Car 2 by Driver A.

In addition, at 332, Car 2 broadcasts the blockchain with appended new block "C2003" to the other nodes in the permissioned network. At 334, the insurance company node receives the blockchain and notes the recorded bad behavior of Driver A and now raises Driver A's insurance premium. At 336, the bank node corresponding to Driver A also notes the bad behavior and increase in the insurance premium. As a result, the bank node decrements Driver A's account for the balance of the insurance premium increase and sends the payment to the insurance company node via smart contract.

Further, Car 2 has an autonomous self-driving mode. At 338, based on rejection of Driver A's electronic credential and that no one else in Car 2 has blockchain authorization to operate Car 2 after 12:00 AM, Car 2 goes into autonomous self-driving mode and takes the occupants to locations corresponding to electronic credentials or locations input manually by occupants. Car 2 records and timestamps the event in the blockchain. Car 2 also sends an invoice for the event to the bank node corresponding to Driver A via smart contract. In turn, the bank node decrements Driver A's account and pays the invoice.

At 340, Driver A regrets the bad behavior and goes to a blockchain-enabled driving school. At 342, after completion of the driving school course, the driving school node records Driver A's completion of the course in the blockchain. At 344, the driving school node broadcasts the blockchain noting the additional driving education to the other nodes in the permissioned network. At 346, the government licensing node notes the additional training and annotates Driver A's electronic credential (i.e., driver license) to indicate her additional study. Further, the government licensing node notes that Driver A is 18 and issues a new license with no parameters or restrictions. At 348, the government licensing node records issuance of the new license in the blockchain. Upon receiving the blockchain, the insurance company node may reduce Driver A's insurance premium for the next tranche of driving. Moreover, at 350, Car 1 gives full operation privileges to Driver A based on the new license without restrictions.

From time to time, Car 1 may go into a safe "training mode" where the vehicle does not move, but steering wheel, brakes, controls, et cetera, are operational with visual display. Training mode can be scheduled or unscheduled via blockchain. Upon completion of approved training simulations throughout Driver A's driving career, Car 1 annotates the blockchain with new blocks indicating the additional training. As a result, corresponding invoices, payments, and insurance are adjusted and made by appropriate nodes connected to the permission network based on information in the blockchain.

Further, the blockchain may continually be cognitively compared with those of other drivers and vehicle nodes. It may be that due to illness, Car 1 observes anomalies in Driver A's driving either in normal on-the-road operations or while in training mode operation based on comparisons. In such a case, Car 1 may restrict or eliminate Driver A's driving privileges pending analysis and verification by a physician and/or by additional training.

Figure 4B:
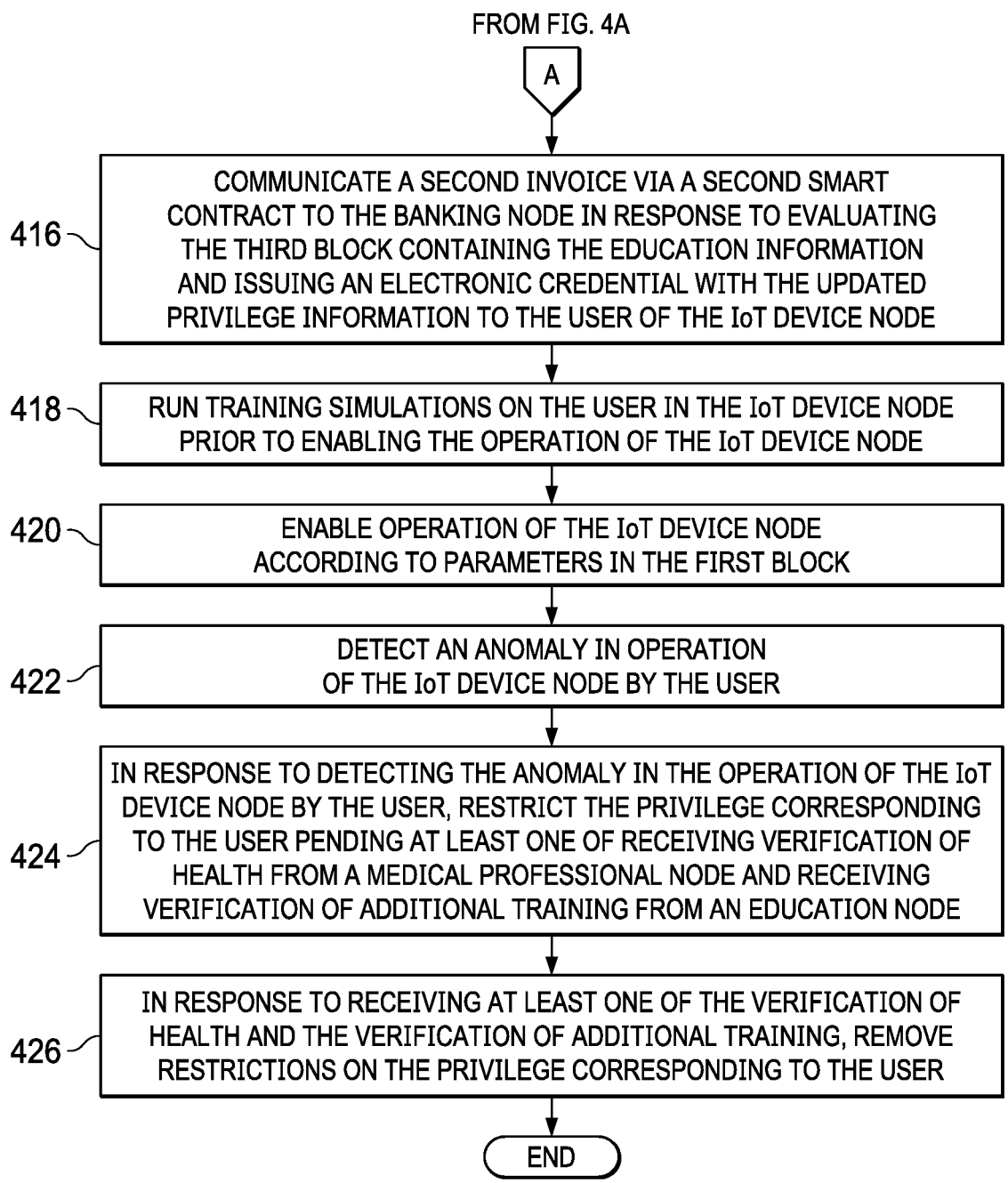

With reference now to FIGS. 4A-4B, a flowchart illustrating a process for providing a cognitive blockchain for user privileges is shown in accordance with an illustrative embodiment. The process shown in FIGS. 4A-4B may be implemented in a network data processing system, such as, for example, network data processing system 100 in FIG. 1.

The process begins when the network data processing system establishes a distributed secure encrypted ledger for storing information related to privileges for users across a plurality of nodes in a permissioned network with known identities (step 402). An Internet of Things (IoT) device node in the plurality of nodes records a first block in the distributed secure encrypted ledger containing activity information related to a privilege corresponding to a user of the IoT device node (step 404). The IoT device node may be, for example, a vehicle and the activity information may be, for example, driving activity by the user while operating the vehicle. IoT is a network of physical devices, such as vehicles, home appliances, and other objects embedded with electronics, software, sensors, actuators, and connectivity, which enables these objects to connect and exchange information. Each thing or object is uniquely identifiable through its embedded data processing system and is able to interoperate within the existing network infrastructure. A licensing node in the plurality of nodes evaluates information in the first block (step 406).

The licensing node records a second block containing privilege information corresponding to the user based on the evaluating (step 408). The privilege information may be, for example, a driver license with driving parameters or restrictions. The licensing node communicates a first invoice via a first smart contract to a banking node in the plurality of nodes based on the evaluating (step 410). An education node in the plurality of nodes records a third block containing education information related to the privilege corresponding to the user of the IoT device node (step 412).

A government licensing node in the plurality of nodes records a fourth block with updated privilege information corresponding to the user of the IoT device node (step 414). The government licensing node communicates a second invoice via a second smart contract to the banking node in response to evaluating the third block containing the education information and issuing an electronic credential with the updated privilege information to the user of the IoT device node (step 416).

The IoT device node runs training simulations on the user in the IoT device node prior to enabling the operation of the IoT device node (step 418). The training simulations may be, for example, driver training simulations that are scheduled via blockchain. The IoT device node enables operation of the IoT device node according to parameters in the first block (step 420). The IoT device node may enable operation of the IoT device node in response to the user successfully completing the training simulations. Conversely, the IoT device node may disable operation of the IoT device node in response to the user failing to complete the training simulations.

Further, the IoT device node may detect an anomaly in operation of the IoT device node by the user (step 422). The IoT device node may detect the anomaly during current real-time operation or training simulation operation of the IoT device node. In response to the IoT device node detecting the anomaly in the operation of the IoT device node by the user, the IoT device node restricts the privilege corresponding to the user pending at least one of receiving verification of health from a medical professional node in the plurality of nodes and receiving verification of additional training from an education node in the plurality of nodes (step 424). The privilege restriction may be, for example, no highway driving. In response to the IoT device node receiving at least one of the verification of health and the verification of additional training, the IoT device node removes restrictions on the privilege corresponding to the user (step 426). Thereafter, the process terminates.

Thus, illustrative embodiments of the present invention provide a method, data processing system, and computer program product for providing a cognitive blockchain for user privileges corresponding to operational control of a vehicle. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a cognitive blockchain for user privileges, the method comprising:
  establishing a distributed secure encrypted ledger for storing information related to privileges for users across a plurality of nodes in a permissioned network with known identities;
  recording, by a vehicle node in the plurality of nodes, a first block in the distributed secure encrypted ledger containing driving activity information corresponding to operational control of the vehicle node by a user having an initial electronic driver license that includes a set of driving restrictions;
  evaluating, by a licensing node in the plurality of nodes, the driving activity information corresponding to the operational control of the vehicle node by the user contained in the first block;
  recording, by the licensing node, a second block containing issuance of a new electronic driver license without driving restrictions to the user of the vehicle node based on the evaluating;
  enabling, by the vehicle node, operation of the vehicle node by the user according to the new electronic driver license issued to the user recorded in the second block of the distributed secure encrypted ledger;
  detecting, by the vehicle node, using embedded sensors, an anomaly in driving of the user in on-the-road operation of the vehicle node;
  responsive to the vehicle node detecting the anomaly in the driving of the user, placing, by the vehicle node, a restriction on the user to drive the vehicle node pending receiving verification of health of the user to drive the vehicle node from a medical professional node in the plurality of nodes; and
  responsive to the vehicle node receiving the verification of health of the user, removing, by the vehicle node, the restriction on the user to drive the vehicle node.

2. The method of claim 1 further comprising:
  communicating, by the licensing node, a licensing fee invoice via a smart contract to a banking node corresponding to the user in the plurality of nodes in response to the licensing node issuing the new electronic driver license to the user based on the evaluating.

3. The method of claim 1 further comprising:
  recording, by an education node in the plurality of nodes, a third block containing education information corresponding to operational control of the vehicle node by the user;
  recording, by the licensing node in the plurality of nodes, a fourth block with updated driver license information corresponding to the user of the vehicle node; and
  communicating, by the licensing node, an invoice via a smart contract to a banking node in response to evaluating the third block containing the education information and issuing an electronic credential with the updated driver license information to the user of the vehicle node.

4. The method of claim 1 further comprising:
  running, by the vehicle node, driver training simulations on the user in the vehicle node prior to enabling the operation of the vehicle node, wherein the driver training simulations are scheduled via the distributed secure encrypted ledger.

5. A network data processing system for providing a cognitive blockchain for user privileges, the network data processing system comprising:
   a storage device, wherein the storage device stores program instructions; and
   one or more processors, wherein the one or more processors execute the program instructions to:
      establish a distributed secure encrypted ledger for storing information related to privileges for users across a plurality of nodes in a permissioned network with known identities;
      record, by a vehicle node in the plurality of nodes, a first block in the distributed secure encrypted ledger containing driving activity information corresponding to operational control of the vehicle node by a user having an initial electronic driver license that includes a set of driving restrictions;
      evaluate, by a licensing node in the plurality of nodes, the driving activity information corresponding to the operational control of the vehicle node by the user contained in the first block;
      record, by the licensing node, a second block containing issuance of a new electronic driver license without driving restrictions to the user of the vehicle node based on the evaluating;
      enable, by the vehicle node, operation of the vehicle node by the user according to the new electronic driver license issued to the user recorded in the second block of the distributed secure encrypted ledger;
      detect, by the vehicle node, using embedded sensors, an anomaly in driving of the user in on-the-road operation of the vehicle node;
      place, by the vehicle node, a restriction on the user to drive the vehicle node pending receiving verification of health of the user to drive the vehicle node from a medical professional node in the plurality of nodes in response to the vehicle node detecting the anomaly in the driving of the user; and
      remove, by the vehicle node, the restriction on the user to drive the vehicle node in response to the vehicle node receiving the verification of health of the user.

6. The network data processing system of claim 5, wherein the one or more processors further execute the program instructions to:
   communicate, by the licensing node, a licensing fee invoice via a smart contract to a banking node that corresponds to the user in the plurality of nodes in response to the licensing node issuing the new electronic driver license to the user based on the evaluating.

7. The network data processing system of claim 5, wherein the one or more processors further execute the program instructions to:
   record, by an education node in the plurality of nodes, a third block containing education information corresponding to operational control of the vehicle node by the user;
   record, by the licensing node in the plurality of nodes, a fourth block with updated driver license information corresponding to the user of the vehicle node; and
   communicate, by the licensing node, an invoice via a smart contract to a banking node in response to evaluating the third block containing the education information and issuing an electronic credential with the updated driver license information to the user of the vehicle node.

8. The network data processing system of claim 5, wherein the one or more processors further execute the program instructions to:
   run, by the vehicle node, driver training simulations on the user in the vehicle node prior to enabling the operation of the vehicle node, wherein the driver training simulations are scheduled via the distributed secure encrypted ledger.

9. A computer program product for providing a cognitive blockchain for user privileges, the computer program product comprising a computer readable storage medium having program instructions embodied therewith, the program instructions executable by one or more processors to cause the one or more processors to perform a method comprising:
   establishing a distributed secure encrypted ledger for storing information related to privileges for users across a plurality of nodes in a permissioned network with known identities;
   recording, by a vehicle node in the plurality of nodes, a first block in the distributed secure encrypted ledger containing driving activity information corresponding to operational control of the vehicle node by a user having an initial electronic driver license that includes a set of driving restrictions;
   evaluating, by a licensing node in the plurality of nodes, the driving activity information corresponding to the operational control of the vehicle node by the user contained in the first block;
   recording, by the licensing node, a second block containing issuance of a new electronic driver license without driving restrictions to the user of the vehicle node based on the evaluating;
   enabling, by the vehicle node, operation of the vehicle node by the user according to the new electronic driver license issued to the user recorded in the second block of the distributed secure encrypted ledger;
   detecting, by the vehicle node, using embedded sensors, an anomaly in driving of the user in on-the-road operation of the vehicle node;
   responsive to the vehicle node detecting the anomaly in the driving of the user, placing, by the vehicle node, a restriction on the user to drive the vehicle node pending receiving verification of health of the user to drive the vehicle node from a medical professional node in the plurality of nodes; and
   responsive to the vehicle node receiving the verification of health of the user, removing, by the vehicle node, the restriction on the user to drive the vehicle node.

10. The computer program product of claim 9 further comprising:
    communicating, by the licensing node, a licensing fee invoice via a smart contract to a banking node that corresponds to the user in the plurality of nodes in response to the licensing node issuing the new electronic driver license to the user based on the evaluating.

11. The computer program product of claim 9 further comprising:
    recording, by an education node in the plurality of nodes, a third block containing education information corresponding to operational control of the vehicle node by the user;
    recording, by the licensing node in the plurality of nodes, a fourth block with updated driver license information corresponding to the user of the vehicle node; and
    communicating, by the licensing node, an invoice via a smart contract to a banking node in response to evaluating the third block containing the education information and issuing an electronic credential with the updated driver license information to the user of the vehicle node.

12. The computer program product of claim 9 further comprising:
running, by the vehicle node, driver training simulations on the user in the vehicle node prior to enabling the operation of the vehicle node, wherein the driver training simulations are scheduled via the distributed secure encrypted ledger.

13. The method of claim 1, wherein the set of driving restrictions consists of maximum driving speed of the vehicle node, limits on when the user is able operate the vehicle node, and circumscribed driving area of the vehicle node defined by GPS coordinates.

14. The network data processing system of claim 5, wherein the set of driving restrictions consists of maximum driving speed of the vehicle node, limits on when the user is able operate the vehicle node, and circumscribed driving area of the vehicle node defined by GPS coordinates.

15. The computer program product of claim 9, wherein the set of driving restrictions consists of maximum driving speed of the vehicle node, limits on when the user is able operate the vehicle node, and circumscribed driving area of the vehicle node defined by GPS coordinates.

* * * * *